US007191933B2

(12) United States Patent
Miyaji

(10) Patent No.: US 7,191,933 B2
(45) Date of Patent: Mar. 20, 2007

(54) AUTOMATIC FARE PAYING DEVICE FOR VEHICLES AND METHOD

(75) Inventor: Masaru Miyaji, Iwatsuki (JP)

(73) Assignee: Asahi Seiko Kabushiki Kaisha, Tokyo (JP)

( * ) Notice: Subject to any disclaimer, the term of this patent is extended or adjusted under 35 U.S.C. 154(b) by 552 days.

(21) Appl. No.: 10/682,770

(22) Filed: Oct. 9, 2003

(65) Prior Publication Data

US 2004/0134746 A1 Jul. 15, 2004

(30) Foreign Application Priority Data

Oct. 11, 2002 (JP) ............................ 2002/299690

(51) Int. Cl.
*G06K 15/00* (2006.01)
*G06K 5/00* (2006.01)
*G07B 15/02* (2006.01)
*G07B 15/00* (2006.01)
*G07F 7/04* (2006.01)

(52) U.S. Cl. ........................ 235/10; 235/378; 235/382; 235/384; 705/13; 194/206

(58) Field of Classification Search .................. 235/10, 235/378, 379, 384, 382; 902/8, 15; 705/13; 194/206; 340/928; 453/1, 58
See application file for complete search history.

(56) References Cited

U.S. PATENT DOCUMENTS

| | | | | | |
|---|---|---|---|---|---|
| 3,613,947 | A | * | 10/1971 | Verbeke | 221/125 |
| 3,670,955 | A | * | 6/1972 | Dominick et al. | 232/7 |
| 3,749,219 | A | * | 7/1973 | Wilson | 194/208 |
| 3,974,961 | A | * | 8/1976 | Dominick et al. | 232/16 |
| 4,130,238 | A | * | 12/1978 | Williams | 232/7 |
| 4,175,989 | A | * | 11/1979 | Pospischil et al. | 194/346 |
| 4,201,333 | A | * | 5/1980 | Oslin et al. | 232/7 |
| 4,210,801 | A | * | 7/1980 | Gomez et al. | 377/7 |
| 4,305,497 | A | * | 12/1981 | Pacilio | 206/81 |
| 4,372,478 | A | * | 2/1983 | Gomez et al. | 232/12 |
| 4,376,442 | A | * | 3/1983 | Gomez et al. | 453/8 |
| 4,458,187 | A | * | 7/1984 | Heiman | 318/490 |
| 4,498,570 | A | * | 2/1985 | King et al. | 194/217 |
| 4,795,087 | A | * | 1/1989 | Procak | 232/7 |
| 4,836,825 | A | * | 6/1989 | Smeets et al. | 453/49 |
| 4,877,179 | A | * | 10/1989 | Baker et al. | 232/7 |
| 4,977,502 | A | * | 12/1990 | Baker et al. | 705/13 |

(Continued)

FOREIGN PATENT DOCUMENTS

GB 2096811 * 10/1982

(Continued)

*Primary Examiner*—Daniel Walsh

(57) ABSTRACT

A compact fare paying device has a housing for receiving a monetary member and at least one verifier unit in the housing for determining the authenticity of the monetary member. A storage device such as a safe can receive the monetary member or a return device can return it to the user. A control unit can compute the monetary value of the monetary member and compare the monetary value to a stored required fare value. If the monetary value is greater than the fare value, the monetary member can then be translated to the return device. If the monetary value is less than the stored fare value, the monetary member is stored for a predetermined time period to enable the user to deposit the required fare. If it is not deposited within the predetermined time period, the temporarily stored monetary value is translated to the return device.

3 Claims, 3 Drawing Sheets

U.S. PATENT DOCUMENTS

| | | | | |
|---|---|---|---|---|
| 5,184,708 | A * | 2/1993 | Levasseur | 194/217 |
| 5,197,588 | A * | 3/1993 | Furuya et al. | 194/217 |
| 5,450,938 | A * | 9/1995 | Rademacher | 194/206 |
| 5,688,165 | A * | 11/1997 | Levasseur | 453/9 |
| 5,799,768 | A * | 9/1998 | Bernier et al. | 194/318 |
| 5,817,231 | A * | 10/1998 | Souza | 210/96.2 |
| 5,892,661 | A * | 4/1999 | Stafford et al. | 361/737 |
| 5,950,795 | A * | 9/1999 | Kojima | 194/241 |
| 6,039,164 | A * | 3/2000 | Waters et al. | 194/206 |
| 6,125,988 | A * | 10/2000 | Waters | 194/217 |
| 6,148,987 | A * | 11/2000 | Bernier et al. | 194/213 |
| 6,278,935 | B1 * | 8/2001 | Kaplan et al. | 701/200 |
| 6,279,718 | B1 * | 8/2001 | Nulph et al. | 194/206 |
| 6,317,755 | B1 * | 11/2001 | Rakers et al. | 707/204 |
| 6,401,009 | B1 * | 6/2002 | Chandonnet | 700/231 |
| 6,601,463 | B2 * | 8/2003 | Paslay | 73/863 |
| 6,994,202 | B1 * | 2/2006 | Billington et al. | 194/217 |
| 2003/0116401 | A1 * | 6/2003 | Ishida et al. | 194/302 |
| 2003/0132288 | A1 * | 7/2003 | Fulcher et al. | 235/381 |
| 2004/0133653 | A1 * | 7/2004 | Defosse et al. | 709/217 |
| 2004/0134746 | A1 * | 7/2004 | Miyaji | 194/217 |
| 2004/0226993 | A1 * | 11/2004 | Fulcher et al. | 235/381 |
| 2005/0087424 | A1 * | 4/2005 | Newsome et al. | 194/320 |

FOREIGN PATENT DOCUMENTS

| | | | |
|---|---|---|---|
| JP | 07334734 | A * | 12/1995 |

* cited by examiner

AUTOMATIC FARE PAYING DEVICE FOR VEHICLES AND METHOD

FIELD OF THE INVENTION

The present invention is directed to a fare collection system that can verify a submission of monetary value and more particularly, to a compact, fare collection device that is only responsive to the submission of a precise fare amount and improves the safety of the operator of the vehicle.

DESCRIPTION OF THE RELATED ART

There are numerous examples of collection systems in the prior art that are capable of receiving coins, tokens, monetary bills, coupons, transfer receipts, and other monetary objects that enables a user to enter and be transported by a vehicle such as a bus, tram, car, cable car, ferry, trolley, train, etc. The safety of the driver or attendant in such vehicles must be maintained and frequently signs are employed to indicate that only a limited amount of currency is carried by the operator and available for making change.

An example of an automatic validating fare box system and method is disclosed for example, in U.S. Pat. No. 6,039,164. This collection system is designed to free the operator from validating the payment of the fare and suggests a fare box that provides a return slot which can be further capable of dispensing change to a patron during the transaction. Another fare collection system is disclosed in U.S. Pat. No. 4,376,442 and describes a mechanical, pneumatic and electrical security device employed in the bus fare box.

The prior art is still seeking to secure the safety of the operator and to limit the space in which a fare paying device will be utilized while further enabling alternative methods of tendering a fare by the user.

SUMMARY OF THE INVENTION

The present invention is directed to a compact fare paying device and method of fare paying that enables an automatic receipt and verification of the required fare in a compact configuration. The fare paying device has a housing interacting with a monetary member presented by a user. At least one verifier unit is in the housing to determine the authenticity of the tendered monetary member and is capable of providing a corresponding signal as to authenticity. A storage device is provided in the housing for storing physical monetary members such as coins, bills, tokens, coupons, transfers, etc. The housing further provides a return device for returning a rejected physical monetary member and a translating device for translating a physical monetary member from a point of entrance within the housing to one of either a safe storage device or the return device. A computing unit comprising for example, appropriate hardware and software such as in a microprocessor system can control the functions of the fare paying device and can compute the monetary value of either the monetary member or a plurality of monetary members that add up to the required fare and accordingly compare the actual monetary value tendered to a predetermined stored required fare sum which enables a corresponding signal. A control unit can be part of the computing unit and can receive signals from the verifying unit and the corresponding signal indicating the submission of the required fare and can activate the translating unit wherein the required fare which is verified is only translated to the storage device and in all other events the monetary member whether verified or not, is translated to the return device. The compact fare paying device can further be provided with the capability of interacting with credit and debit cards and smart cards and/or transponders that can store a predetermined number of monetary units that can be debited by the required fare amount.

DETAILED DESCRIPTION OF THE PREFERRED EMBODIMENTS

Figure 1:
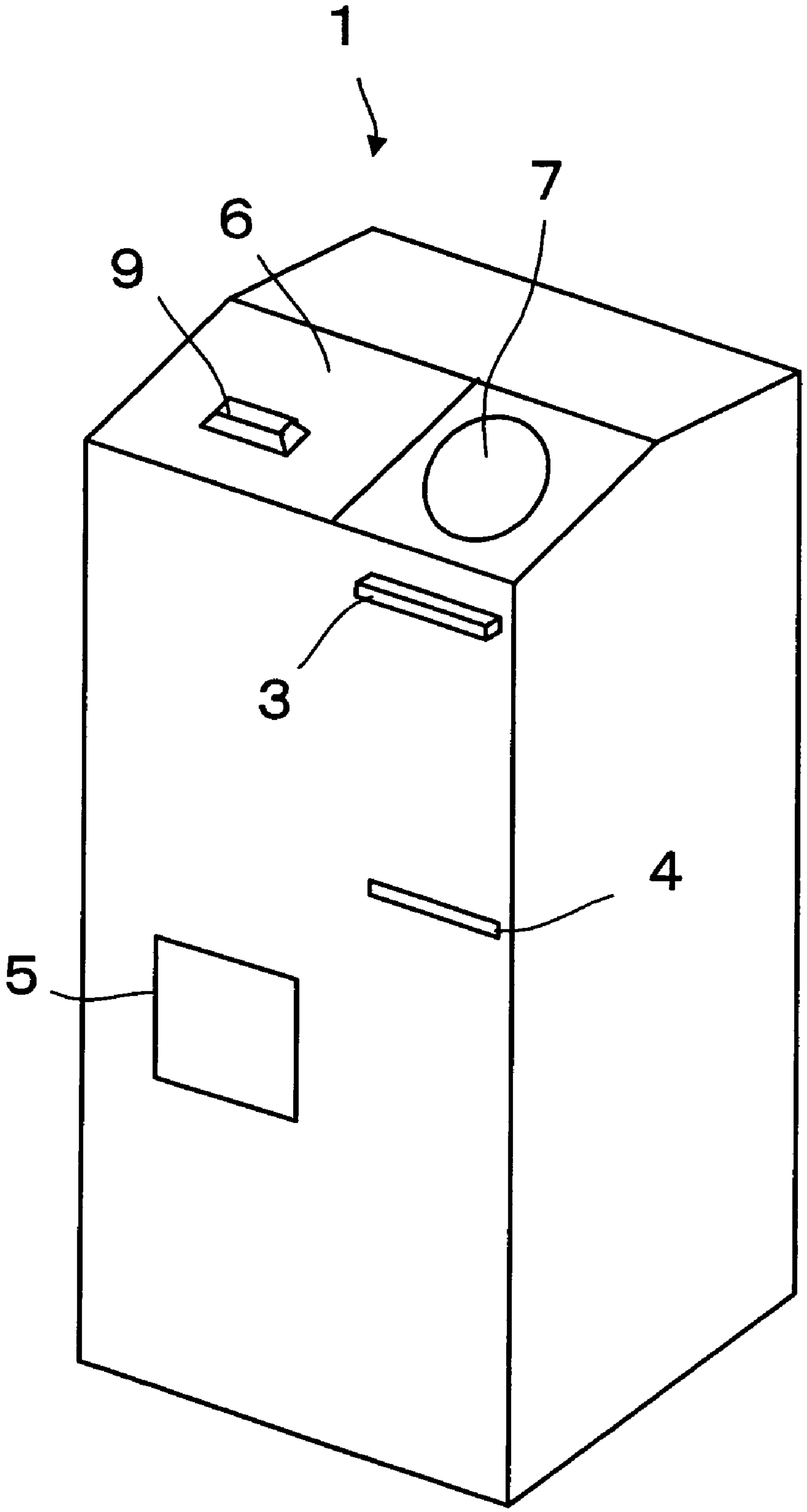
FIG. 1 is a schematic perspective view of a fare paying device of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the intention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention seeks to provide a very compact housing configuration compatible with the ability of accepting various forms of tendered payment while discouraging theft. The compact fare paying device of the present invention can utilize various and known components that have been provided in other fare collecting and change dispensing devices such as the authentication of both coins and bills, the provisions of safes or storage devices for receiving monetary objects and the ability to provide sensors or readers for magnetic and optical charge and debit cards, smart cards and transponders.

Within this environment, the present invention has made specific design choices to particularly address the needs of a compact fare paying device for a vehicle such as a bus fare box and has limited the space necessary within such a fare box by removing traditional features such as a change making device wherein bills and/or coins must be charged into the device and stored appropriately with mechanisms for dispensing the appropriate amount of return change to the user.

The present invention has provided a device that will interact only with the submission of the exact fare while maintaining the conventional methods of submitting such fares by the user in the form of monetary objects and members such as monetary coins and bills or other forms of tokens, coupons, transfers, etc.

The present invention has further expanded the manner in which the exact fare is submitted by accommodating magnetic and optical card readers for debit and charge instruments including smart cards and various forms of transponders that interact with an antenna that can receive and transmit data in an interchange with the device presented by the user for the fare.

By the exercise of these design options, a unique compact fare paying device that addresses both the safety of the operator, the convenience of the user and a large variety of making payments is provided. For example, one design option that can be enabled within the perimeters of the present invention is to simplify the compact fare paying device so that when the monetary object submitted by the user is not equal to a predetermined fare amount and it is not supplemented with the adequate, exact fare within a predetermined time period, the monetary members are automatically returned.

Conversely when the exact fare is submitted in physical monetary objects within the predetermined time period, then the received bill or note and/or coin are submitted to a safe box which is not accessible by either the user or the operator except by an authorized entry device or destruction of the compact fare paying device.

Referring to FIG. 1, a fare paying device in the form of a rectangular box housing 1 can have a note or bill receiving slot 3 and a coin or token slot 9. Within the definitions of the present invention, the monetary members or objects can be considered to be either a bill or coin or combinations thereof which can be tendered to meet the required fare amount. As can be readily appreciated, other forms of value can be provided by tokens, medallions, coupons, transfers, etc. and accordingly, the present invention is not limited to a specific currency or form of object which is representative of the value that can be utilized as a fare and the term monetary member is used in a generic manner.

FIG. 1 is only representative of a schematic device and it can be appreciated that the slanted surface 6 on the housing 1 can also incorporate a display member to indicate the acceptance of the submission of the proper fare. Additionally, an antenna 7 which can transmit or receive, depending on the transponder or smart card, can be utilized by the user for tendering the fare. Also on the housing 1 is a magnetic card receipt slot 4 for receiving credit and debit cards and smart cards. Finally, a return slot 5 is disclosed for returning any rejected monetary members. As can be appreciated, the fare paying device can be subjectively programmed for one or more amounts of fare and for specific currency denominations.

Figure 2:
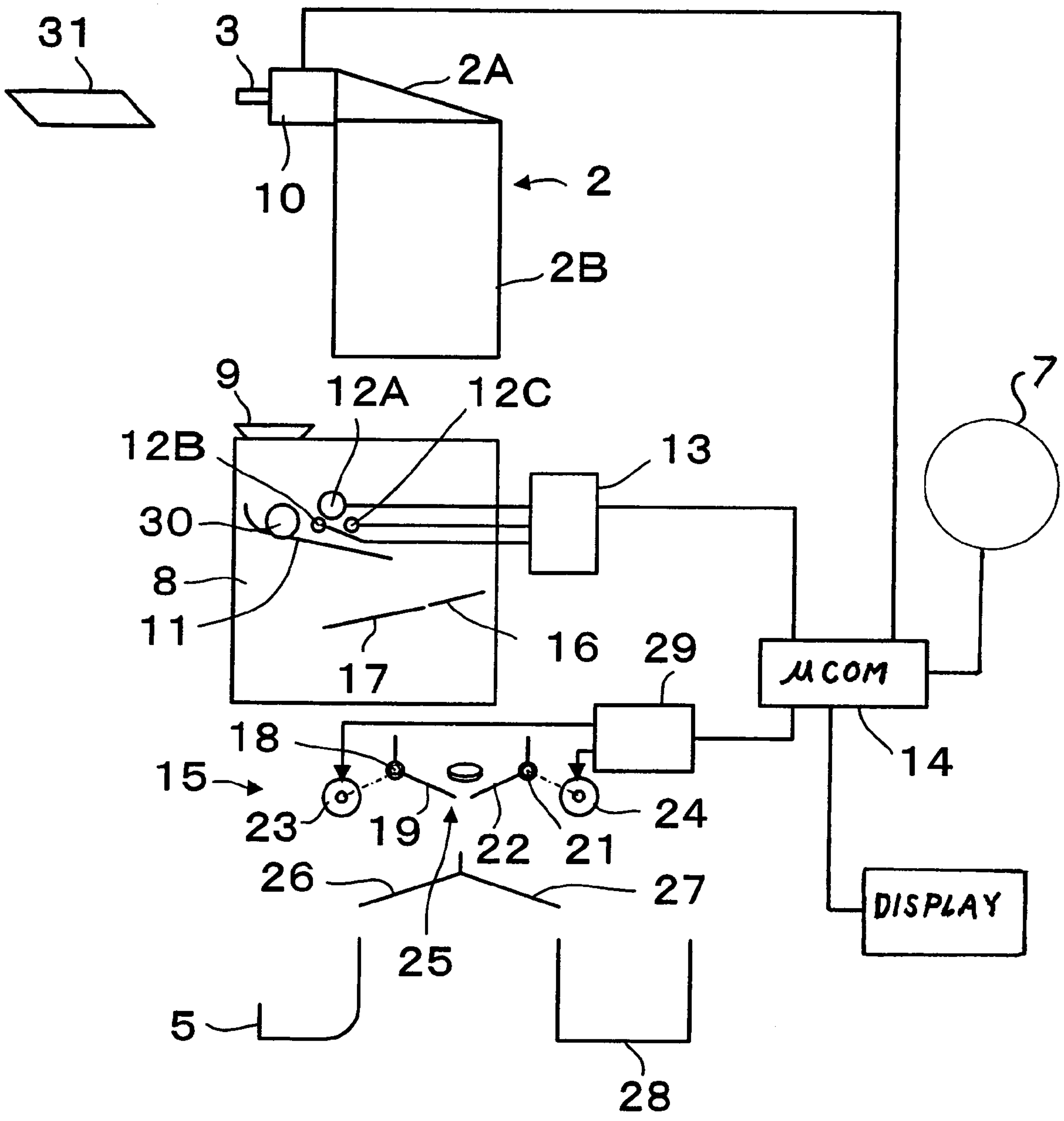
FIG. 2 is an illustrative schematic of operative features of the present invention and FIG. 3 is a flow chart disclosing an operation of some of the features of the present invention.

Referring to FIG. 2 a schematic drawing illustrating the operative principles and features of the present invention is disclosed. A bill or note 31 can be submitted through the entrance slot 3 into a note acceptor 10. The note acceptor 10 has a capacity of distinguishing the authenticity of a monetary member in a manner known in the present art. Accordingly, the specific details will not be repeated herein.

The note or bill 31 can be held in a temporary storage unit 2A until either the proper number of notes have been submitted to collectively represent a predetermined monetary value of the fare and/or the authentication has been determined. If the proper fare is not submitted within a predetermined time period, which can be determined from a timer unit not shown that is activated upon the initial entrance of the bill 31 through for example optical sensors, the bills are then returned through the same entrance slot 3. Thus, the entrance slot 3 can serve the same function of both an opening for receiving a monetary member and a return device for rejecting the monetary member.

The coin slot 9 is operatively connected to a coin selector 8 that can include coil sensors 12A, 12B and 12C that can be located along a guiding rail 11 which in turn are connected to a coin distinguishing unit 13. Both the note acceptor 10 and the coin distinguishing unit 13 can provide signals to a controlling unit 14 such as a microcomputer system with appropriate firmware/software instructions. When a note or bill 31 has been authenticated and is considered to be genuine and the exact fare amount has been entered it is then directed to permanent storage in the safe 2B.

Likewise, when a coin has been determined to be false by the coin distinguishing unit 13 a gate 16 remains closed and the coin is then dropped from the guiding rail 11 onto the false coin guide 17 so that it is returned to the return device or dispensing slot 5. If the coin has been determined to be genuine, the gate 16 can be activated to be open and the individual coin is dropped down and stored in a temporary coin storing section 15.

The temporary coin storing section 15 includes a return bottom member 19 which can pivot about shaft 18 and also a receiving plate 22 that can pivot about shaft 21. A rotary solenoid 23 can be utilized to pivot the returning bottom 19 while rotary solenoid 24 can be utilized to pivot the receiving plate 22.

Usually the return bottom member 19 and receiving plate 22 are pivoted in opposite directions and together they make up a storing bottom 25. Accordingly, the coins 30, which are determined to be genuine, will accumulate for temporary storage on the storing bottom 25.

When return bottom member 19 is pivoted in the clockwise direction by the rotary solenoid 23 as shown in FIG. 2, the coins will then slide down on the slanting guiding plate 26 which is located under the return bottom member 19 to be thereby guided to the returning slot 5 if the proper fare has not been submitted within a predetermined time period.

If however, the proper fare has been submitted, the receiving plate 22 will be pivoted counter clockwise by the rotary solenoid 23 and the coins will slide on a separate slanting guiding plate 27 so that they are directed to be stored in the safe 28.

The controlling unit 14 can process denomination information from genuine coins from the coin accepting unit 13. When the total reaches a predetermined amount equal to the fare, the accepting unit 13 outputs a direction signal to driving unit 29. The rotary solenoid 24 is then operated based on the directional signal so that the receiving plate 22 is pivoted in a counter clockwise direction. As a result, the coins are stored in safe 28.

When the amount of the receiving coins is larger than the predetermined amount, the rotary solenoid 23 is operated by the driving unit 29 so that the returning plate 19 is pivoted in the clockwise direction and the temporary stored coins are then returned to the returning slot 5 for access by the user.

As can be appreciated, the antenna 7 can also input signals to the controlling unit 14 and the display can also be activated to indicate the status of the process, for example, that sufficient monetary members have been entered to pay the fare.

As a further illustration, if the fare amount is $1 and a customer enters $1 coin 30 in the coin slot 9, coin 30 rolls in the guiding rail 11 and is sensed by the sensors 12*a*, 12*b*, and 12*c*. The coin distinguishing unit 13 distinguishes whether the coin 30 is genuine or false based on the sensors. If the coin 30 is determined to be false, gate 16 is not opened and it is immediately returned to the returning slot 5 through the false guide 17.

When coin 30 is found to be genuine, gate 16 is opened and the coin 30 is directed to the coin storing section 15.

Figure 3:
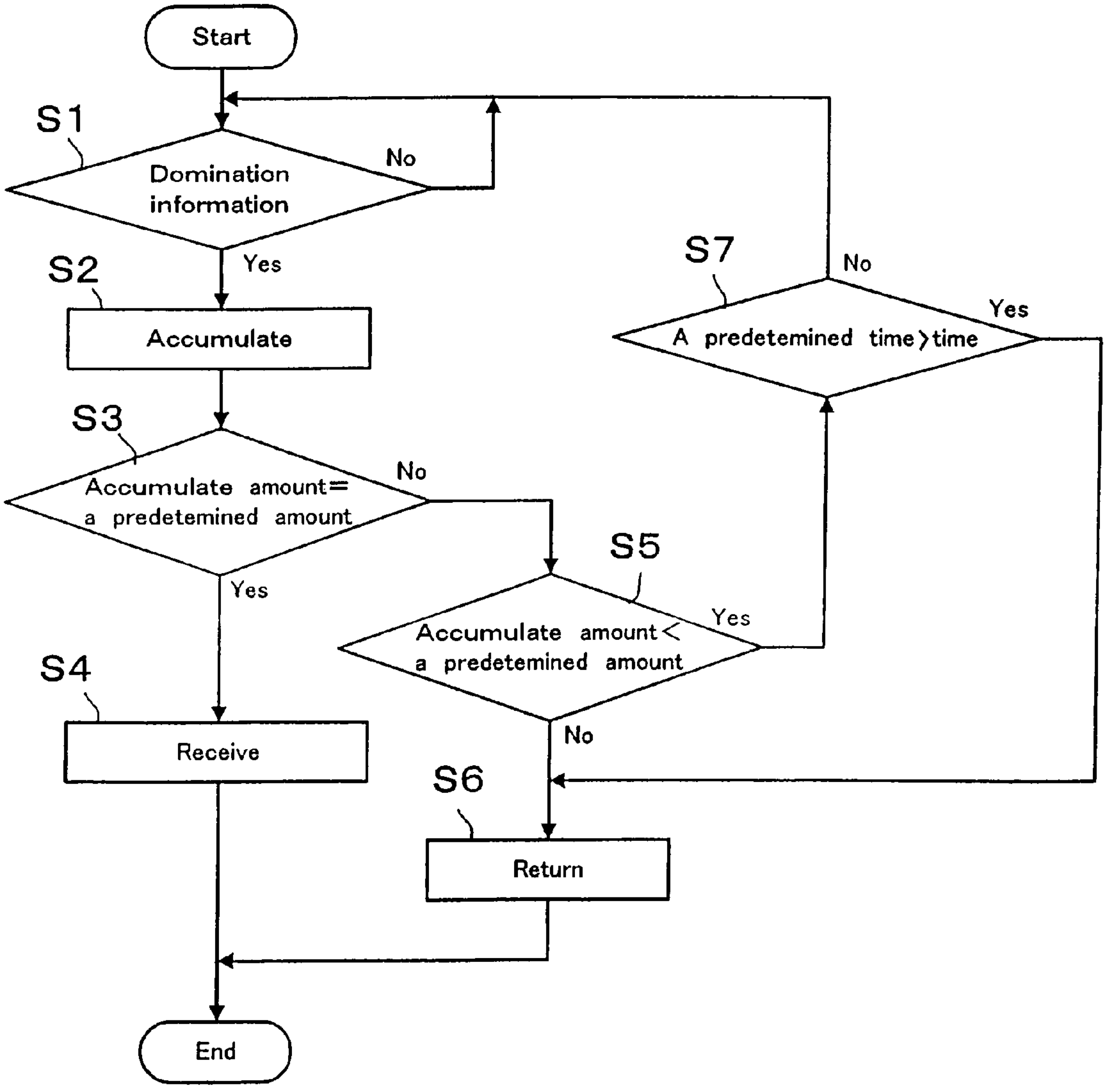

Referring to FIG. 3, a flowchart illustrating one feature of the present invention is disclosed. These series of instructions can be implemented by the controlling unit 14. In step 1, the denomination information is distinguished to determine whether an authentic monetary object, such as a dollar bill, has been entered into the fare box. The bill can be temporarily stored or accumulated at step 2. At step 3 a decision is made as to whether the accumulated amount equals a predetermined amount which has been stored in the system and is equal to the desired fare. If the predetermined amount, for example, is only one dollar and a single dollar bill has been entered, then the amount is determined as equal and the program proceeds to step 4 to release and store the bill in a permanent storage safe 2B. If in the decisional step 3 the accumulated amount does not equal a predetermined amount, the decision is made at step 5 as to whether the accumulated amount is less than the predetermined amount. If the answer is yes, the program proceeds to step 7.

At step 7 a timer unit, not shown, which has been activated by the entrance of the dollar bill is compared with a predetermined time period. If the predetermined time period has not expired, the program returns back to step 1 for determination of the entrance of additional dollars. If, however, at step 7 the predetermined time period has expired, the dollar bills are then returned through the entrance slot 3 to the user.

In the case of the coins, if a one dollar genuine coin is determined at step 2 the dollar coin is accumulated which is equivalent to the accumulating unit. At step 3, the accumulated amount is compared to the predetermined amount of one dollar when the amount is equal the program again proceeds to step 4. At step 4 the rotary solenoid 24 is actuated and the receiving plate 22 is pivoted in a counter clockwise direction so that the temporary stored coin 30 will slide on a second slanting guiding board 27 to be received in the safe 28.

If we assume that the customer enters a two dollar coin, perhaps by mistake, it will obviously differ from the predetermined amount at step 3. As such, the program will then proceed to step 5 and since it is larger than the predetermined amount the program will then advance to step 6. At step 6 the rotary solenoid 23 will be actuated and the return board 19 will be pivoted in the clockwise direction. Therefore, the temporary stored coin will slide on the slanting guide plate 26 and be returned to the returning slot 5.

Another example would be if the customer plans to enter two 50 cent pieces upon entrance of a genuine 50 cent piece, the program would go from step 3 through step 7. The program will distinguish a time period from the denomination signal to a predetermined time period that has been stored. When the time period is not over the predetermined time period the program will go to step 1 and will await subsequent submission of a coin. If the time period, however, expires, the program will go from step 7 to step 6 and return the coin.

As can be appreciated, a combination of bills and coins can be used for the fare.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. A compact, automatic exact-fare payment accepting device enabling use of a vehicle by a user comprising: a housing having a first opening for receiving coins, a second opening for receiving bills, and a third opening for receiving a card including a credit, debit, and smart card, the housing further having an antenna location indicated on the housing for interacting with a transponder;

means for automatically verifying the authenticity of one or more coins tendered in a single exact-fare payment transaction through the first opening and means for computing the total monetary value of the one or more coins tendered in the single exact-fare payment transaction;

means for automatically verifying the authenticity of one or more bills tendered in a single exact-fare payment transaction through the second opening and means for computing the total monetary value of the one or more bills tendered in the single exact-fare payment transaction;

a display on the housing to indicate when an exact-fare payment amount is reached through user tendered coins, bills, or a combination thereof;

means for returning to a user all tendered coins and bills from a single exact-fare payment transaction when a total computed value of all coins and bills tendered by the user in the single exact-fare payment transaction exceeds the exact-fare amount;

means for providing a predetermined time period, which is initiated by the entrance of a first one of the one or more tendered coins or bill; and means for activating the return of all coins and bills tendered for a single exact-fare payment transaction when the predetermined time period expires before an exact-fare value is computed from either or both of the means for computing the monetary value of the tendered coin and the means for computing the monetary value of the tendered bill, wherein the compact, automatic exact-fare paying device does not require intervention by an operator of the vehicle to process exact-fare transactions, and the compact, automatic exact-fare payment device only accepts a tendered amount equal to the exact-fare in every transaction and enables use of the vehicle by the user.

2. A compact, exact-fare paying device, mounted in a vehicle, providing an automatic receipt and verification of a required exact-fare to enable use of the vehicle by a user, comprising;

a housing having an opening that receives at least one monetary member tendered as payment in a single exact-fare payment transaction;

at least one verifying unit in the housing that determines the authenticity of the at least one monetary member and provides a corresponding signal;

a storage device in the housing that stores the at least one monetary member;

means to translate the at least one monetary members from the opening to one of the storage device and the return device;

means to compute the monetary value of the at least one monetary member tendered and to compare the monetary value tendered to an exact-fare required to provide a corresponding signal;

a control unit that receives the signals from the verifying unit and the means for computing, and activates the means for translating wherein in every instance, only when an exact-fare required is verified, is the monetary member translated to the storage device, otherwise the monetary member is translated to the return device;

and means for providing a predetermined time period which is started by the receipt of a first one of the at least one monetary member wherein the means for computing will activate the means for translating to direct the at least one monetary member to the return device if the exact-fare required fare is not verified within the time period, wherein the compact, exact-fare paying device only accepts exact-fare in every transaction and enables use of the vehicle by the user.

3. A compact, exact-fare paying device, mounted in a vehicle to provide an automatic receipt and verification of a required exact-fare to enable use of the vehicle by a user comprising;

a housing having an opening for receiving monetary members, the housing having a slanted surface on top;

a coin slot for receiving coins, the coin slot located at the slanted surface;

an antenna for sensing information on a smart card, the antenna located at the slanted surface;

a bill receiving slot for receiving a bill, the bill-receiving slot located at a perpendicular surface of the housing;

a card receipt slot for receiving a card, the card receipt slot located under the bill-receiving slot on the perpendicular surface;

a return slot for returning coins, the return slot located under the coin slot;

a receipt slot positioned adjacent the receipt slot on the perpendicular surface;

means for automatically verifying the authenticity of one or more coins tendered on the coin slot in a single exact-fare payment transaction and means for computing the total monetary value of the one or more coins tendered in the single exact-fare payment transaction;

means for automatically verifying the authenticity of one or more bills tendered in a single exact-fare payment transaction and means for computing the total monetary value of the one or more bills tendered in the single exact-fare payment transaction;

means for returning tendered coins and tendered bills if the total computed value of the tendered coins, bills, or a combination thereof in a single exact-fare payment transaction, exceeds an exact-fare value;

means for storing the at least one coin, bill, or combination thereof when the computed monetary value is equal to a predetermined exact-fare for a signal exact-fare payment transaction;

means for providing a predetermined time period which is initiated by the entrance of a first one of the at least one coin and bill; and means for activating one of the means for returning the tendered coins, bills, or combination thereof when the predetermined time period expires before the means for computing the total monetary value of the one or more coins tendered and one or more bills tendered, or a combination thereof computes an exact-fare value, wherein the compact, exact-fare paying device does not require intervention by an operator of the vehicle to process exact-fare transactions, only accepts exact-fare in every transaction, and enables use of the vehicle by the user.

* * * * *